US006852923B2

(12) United States Patent
Perry et al.

(10) Patent No.: US 6,852,923 B2
(45) Date of Patent: Feb. 8, 2005

(54) DEVICE AND METHOD FOR IMPARTING MOVEMENT TO A SELECTED LINE

(75) Inventors: Donald L. Perry, Austin, TX (US); Russell W. White, Austin, TX (US)

(73) Assignees: SBC Services, Inc., San Antonio, TX (US); Southwestern Bell Telephone Co., San Antonio, TX (US)

(*) Notice: Subject to any disclaimer, the term of this patent is extended or adjusted under 35 U.S.C. 154(b) by 428 days.

(21) Appl. No.: 10/139,093

(22) Filed: May 3, 2002

(65) Prior Publication Data

US 2003/0205702 A1 Nov. 6, 2003

(51) Int. Cl.[7] .................................................. H02G 3/08

(52) U.S. Cl. ............................ 174/50; 174/63; 174/58; 340/533; 324/539

(58) Field of Search .............................. 174/50, 58, 63, 174/64; 220/402; 324/539, 540, 66; 340/533; 248/906; 439/535

(56) References Cited

U.S. PATENT DOCUMENTS

| | | | | |
|---|---|---|---|---|
| 3,681,686 A | | 8/1972 | Connally | |
| 3,836,696 A | * | 9/1974 | Gressitt et al. | 174/41 |
| 3,891,811 A | | 6/1975 | Miller | |
| 4,609,789 A | | 9/1986 | Ray et al. | |
| 4,736,158 A | | 4/1988 | McCartney | |
| 4,748,402 A | | 5/1988 | Sillati | |
| 4,837,488 A | | 6/1989 | Donahue | |
| 4,937,519 A | | 6/1990 | Fields, III | |
| 4,937,529 A | | 6/1990 | O'Toole, III et al. | |
| 5,027,074 A | * | 6/1991 | Haferstat | 324/539 |
| 5,384,540 A | | 1/1995 | Dessel | |
| 5,465,478 A | * | 11/1995 | Anderson et al. | 29/748 |
| 5,627,474 A | | 5/1997 | Baudisch | |
| 6,184,689 B1 | | 2/2001 | Shipley | |
| 6,307,469 B1 | | 10/2001 | Mandry | |
| 6,768,055 B1 | * | 7/2004 | Gorin | 174/50 |
| 6,794,572 B1 | * | 9/2004 | Chiang | 174/50 |

* cited by examiner

*Primary Examiner*—Dhiru R. Patel
(74) *Attorney, Agent, or Firm*—Toler, Larson & Abel, LLP

(57) ABSTRACT

A device and method for imparting movement to a selected line are disclosed. A device incorporating teachings of the present invention may include a motion arm extending through an opening in the housing of the device. The arm may be coupled to a connection clip that can grip a selected line. The selected line may include, for example, twisted pair, coaxial cable, optical cable, shielded high-gauge wire, etc. In some embodiments, the arm of the device is coupled to a motion generator that imparts movement to the motion arm in at least one direction. In operation, the imparted movement may be conveyed through the motion arm and the connection clip to the selected wire.

15 Claims, 2 Drawing Sheets

DEVICE AND METHOD FOR IMPARTING MOVEMENT TO A SELECTED LINE

BACKGROUND OF THE INVENTION

Lines of various types are often routed from place to place in large groups or bundles. Often, these bundles are placed within a series of trays, which may help protect the lines from damage and protect operators working around the lines from certain hazards like tripping. While placing lines in bundles and securing the bundles in an "out of the way" manner may provide several benefits, it also creates challenges for technicians asked with maintaining and working with the lines.

Often, a specific line needs to be identified and traced from point A to point B. If the line is located within a bundle of lines and the bundle is located within an elevated tray, the tracing process can be very difficult and time consuming. This is especially true when the line remains in service during the trace. Many conventional techniques for tracing conductive lines involve adding an electrical signal to the line at point A and "listening" for the signal at point B. If the line is to remain in service during the trace, the added signal may create unacceptable levels of noise or interference.

A second approach requires multiple technicians. A first technician identifies the line to be traced and tugs on it. A second technician moves a few feet down the tray and watches the bundle closely to identify which line is moving in response to the tugging of the first technician. The technicians can continue the process in a leapfrog fashion until the line has been traced all the way to Point B. Such a multiple technician approach can quickly become expensive.

DETAILED DESCRIPTION OF THE INVENTION

Devices and methods that incorporate the teachings described herein may offer a relatively inexpensive and accurate technique for imparting movement to a selected line and for tracing the selected line. In addition, such devices and methods may allow for "in service" tracing of lines.

Figure 1:
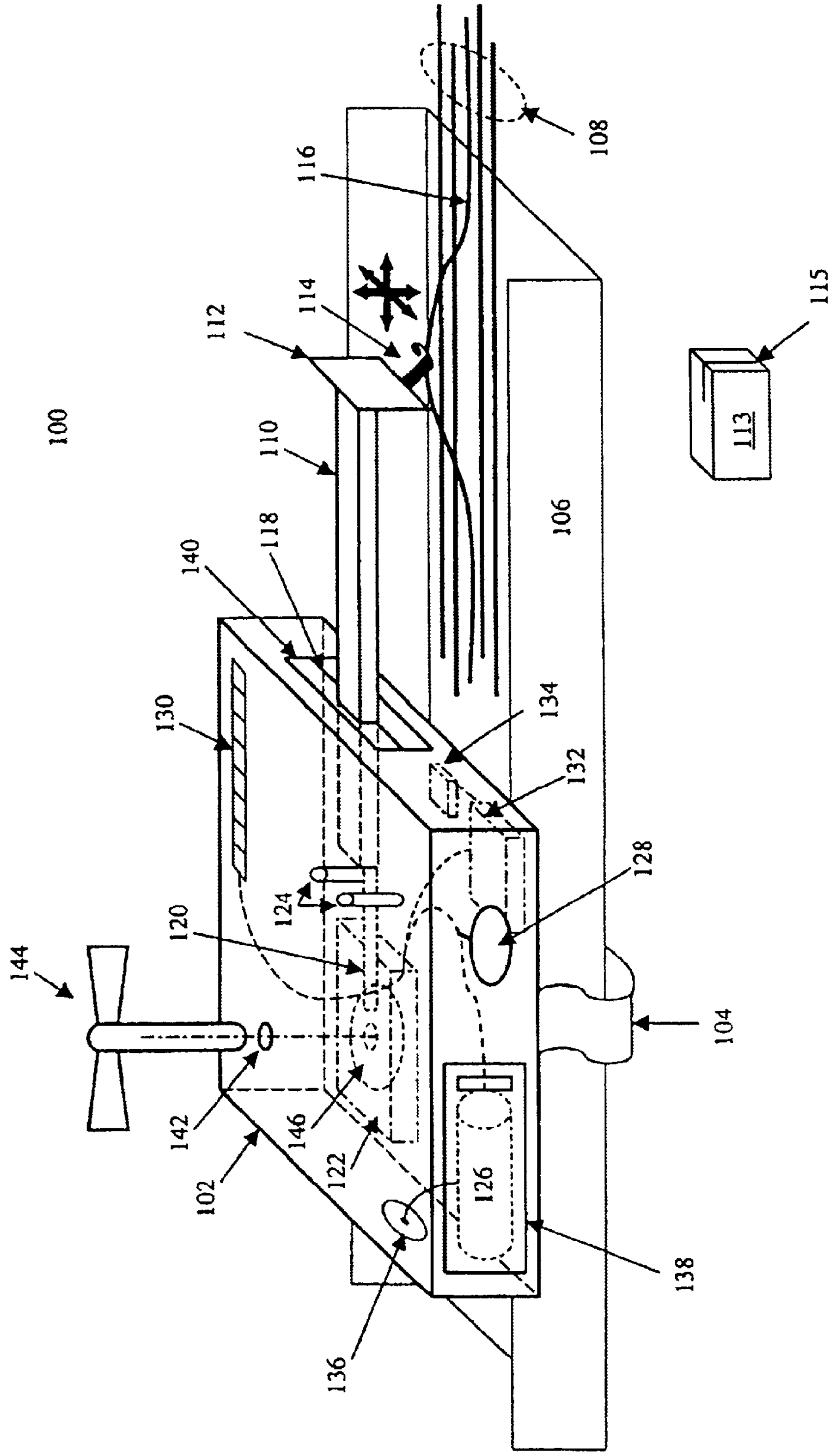
FIG. 1 illustrates a device for imparting movement to a selected line that incorporates teachings of the present disclosure.

As mentioned above in the brief description of the figures, FIG. 1 illustrates a device that incorporates teachings of the present disclosure for imparting movement to a selected line. Device 100 includes housing 102 that may be formed of various types and combinations of materials. For example, housing 102 may be kept relatively light by forming it primarily of extruded plastic or aluminum. In some embodiments, housing 102 may include a strap 104 for releaseably securing device 100 in a desired location. Strap 104 may be made of an elastic material and may include a clasping mechanism to facilitate easy-on/easy-off securing of device 100.

As depicted in FIG. 1, device 100 is secured to tray 106, which contains a bundle 108 of lines. Bundle 108 may include various types of lines. For example, the lines of bundle 108 may be twisted pair, coaxial cable, optical cable, shielded high-gauge wire, etc.

In operation, a motion arm 110 having a connection surface 112 and a connection clip 114 may be attached to a selected line 116. Connection clip 114 may employ any of several methodologies for attaching or gripping to selected line 116. For example, connection clip 114 may resemble an alligator clip, a plastic clip, or a block of rubber with a slit within which selected line 116 may be placed.

In some embodiments, motion arm 110 may move such that connection clip 114 can be pulsed or moved in any or all of the X, Y, and Z coordinates. Motion arm 110 may extend into housing 102 through grommet 118, which may be formed of a generally flat and rectangular piece of rubber with an opening formed there through. Motion arm 110 may be connected via link 120 to a motion generator 122. In some embodiments, link 120 may pass between or through motion guides 124. Motion guides 124 may help ensure that the forces applied to link 120 by motion generator 122 create ample movement at connection clip 114.

Those skilled in the art will recognize that there may be several types of motion generators and several techniques for communicating the movement created by motion generator 122 to motion arm 110 and connection clip 114. For example, motion generator 122 may include, among other things, a linear actuator, a drive wheel, or a spinning shaft. In some embodiments, the techniques and components for communicating movement created by motion generator 122 could include, for example, a rigid connecting rod, a wheel/pitman combination, cams, a gearing system, or some combination of linkages.

In some embodiments, motion generator 122 may be powered by battery 126. As such, motion generator 122 may be effectively "turned on" by triggering switch 128. In addition, housing 102 may include indicator 130 for indicating the relative strength of battery 126. Indicator 130 may be include a series of light emitting diodes (LED's), which are all lit when battery 126 is relatively strong and all dark when battery 126 is relatively weak.

Device 100 may also include a controller 132, which may be a micro-controller or embedded circuitry. Controller 132 may be communicatively coupled to motion generator 122 and may provide control signals that indicate the desired output of motion generator 122. For example, controller 132 may direct motion generator 122 to increase or decrease the frequency and/or amplitude of its output. Controller 132 may direct motion generator 122 to move in a specific pattern or in one or more of the X, Y, and Z coordinates.

In some embodiments, controller 132 may be communicatively coupled to receiver 134. Receiver 134 may be a radio frequency receiver or transitive and may allow for remote operation and control of device 100. Such remote operation may be necessary in some situations.

For example, a technician (not depicted in FIG. 1) may have attached selected line 116 to device 100 via connection clip 114. The technician may have initiated movement of motion arm 110 and then moved to a spot several feet away from device 100 in order to identify and trace selected line 116. If the technician determines that the motion being imparted by device 100 is not sufficient to positively identify selected line 116 from the other lines of bundle 108, the technician may wish to adjust the type, frequency, and/or amplitude of the movement. Receiver 134 may allow the technician to remotely "tell" device 100, controller 132, and/or motion generator 122 to make the required modifications to the motion being imparted to selected line 116.

As depicted in FIG. 1, device 100 may be powered in several different ways. Interface 136 may allow device 100 to be attached to and use power supplied by a wall outlet. Additionally, interface 136 may allow for the recharging of battery 126. If battery 126 is not recharge able, an operator may access and change battery 126 by dislodging access panel 138, which may form a portion of housing 102.

Housing 102 may have other openings that provide access to its interior. For example, motion arm opening 140 may be formed in housing 102 such that grommet 118 can be secured in place and can effectively act in a manner similar to motion guides 124. In some embodiments, a winding port 142 may be provided. Winding port 142 may allow a key 144 to be inserted and/or secured to housing 102. Key 144 may support non-electrical operation of device 100 through the winding of a drive spring 146. Key 144 may be used to manually wind drive spring 146, and once wound, drive spring 146 may drive motion generator 122.

Figure 2:
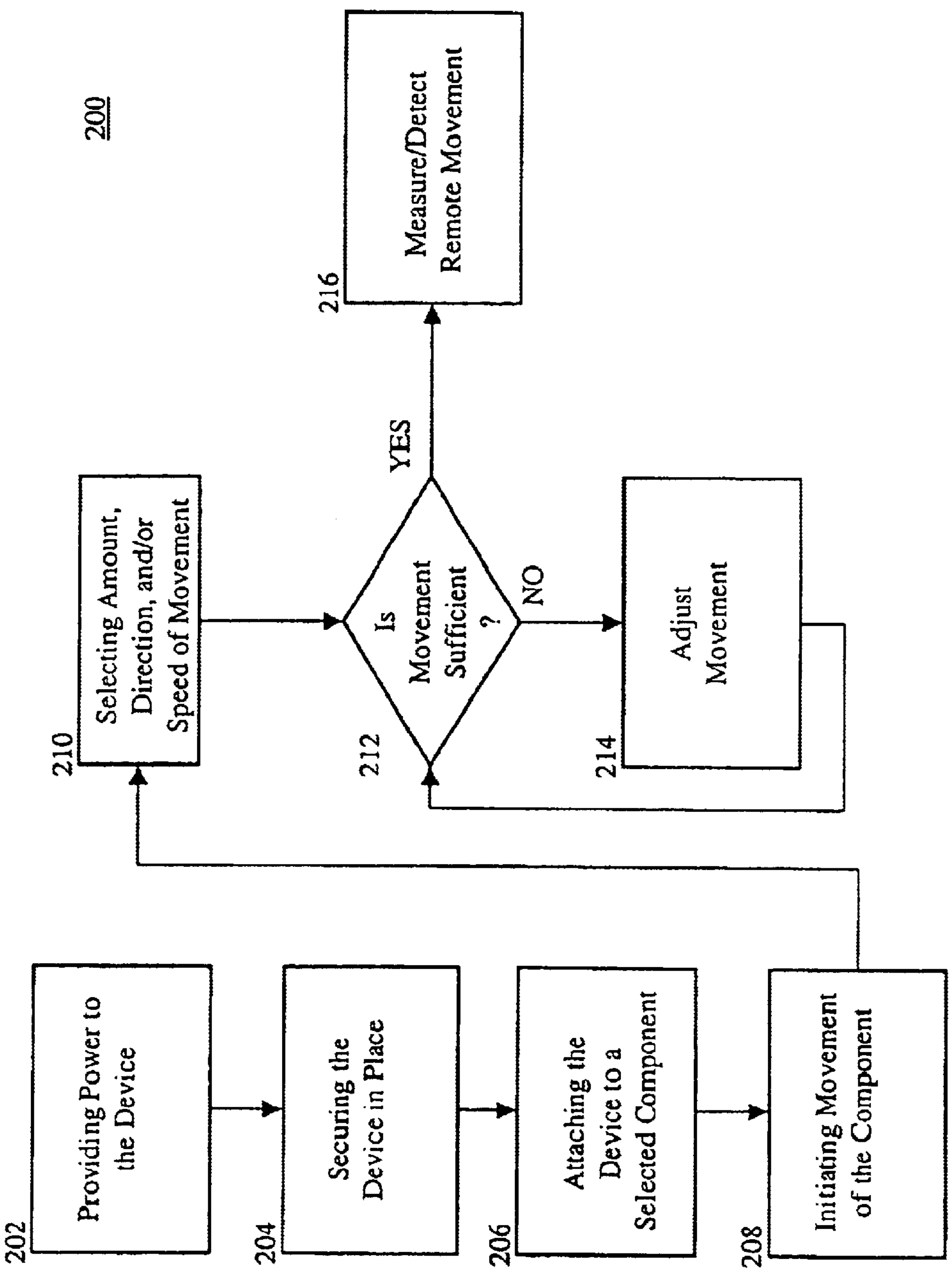
FIG. 2 shows a block diagram depicting a method for imparting movement to a selected line that incorporates teachings of the present disclosure.

As mentioned above in the brief description of the figures, FIG. 2 depicts a method that incorporates teachings of the present disclosure for imparting movement to a selected line. Method 200 begins with power step 202, where power is provided to a device, such as device 100 of FIG. 1. The power may be provided in several ways. For example, power may be provided by inserting a battery into the device, by winding a drive spring, or by plugging the device into a wall outlet.

Method 200 proceeds from power step 202 to securing step 204, where the device is secured in place. The device may be secured in place in any number of ways. For example, the device may be strapped to a tray or rail using a clasped strap or elastic band. In some embodiments, the device may be secured in place with magnets or slip resistant feet, which may be made of rubber. In still other embodiments, the device may be more permanently fixed in place using adhesives, rivets, or threaded connectors.

Method 200 proceeds from securing step 204 to attaching step 206, where a selected line is attached to the device. The attaching step may employ any of several methodologies for attaching the selected line to the device. For example, the device may include a connection clip that resembles an alligator clip or a plastic clip, which pinches onto the line without damaging the line. The device may also include a block of material (e.g., rubber) formed with a slit within which the selected line may be placed. The block's material may have a relatively high coefficient of friction, which may allow for good attachment forces without excessive pressure being placed on the selected wire.

Method 200 proceeds from attaching step 206 to initiating step 208, where the device begins to impart motion to the selected line. Depending on the device and the desires of the operator, the motion may include movement in any one or combination of the X, Y, and Z coordinates. If the device allows and the operator desires, the amount, direction, frequency, and/or amplitude of the motion may be initially selected by the operator at selection step 210.

The operator or technician may take up a new position a few feet or several feet away from the location of the device. The operator may attempt to discern which of the lines included within the bundle is the selected line to which the device is imparting motion. The operator may try to feel the lines in the bundle to determine which one is being pulsed or moved. The operator may try to listen and hear which of the lines is being pulsed or moved. The operator may visually inspect the lines to determine which line is being pulsed or moved. Occasionally, the operator may try one or more of these and other techniques and still be unable to determine which line in a bundle is the selected line.

As such, the operator may decide at determining step 212 that the movement being imparted to the selected line is not sufficient to reliably determine at the operator's remote location which line in the bundle is the selected line. If the operator decides that the motion is not sufficient, the operator may attempt to adjust the movement imparted to the selected line at adjusting step 214. Depending on the device and the availability of additional technicians, the operator may choose to go back to the device imparting movement and adjust it locally. In some embodiments, the operator may cycle through pre programmed motion routines stored on the device. For example, the operator may cycle through stored motion routines with a switch like triggering switch 128 of FIG. 1 a first stored motion routine comprising control signals that indicate a first desired output of the motion generator; and a second stored motion routine comprising control signals that indicate a second desired output of the motion generator.

With feature-focused devices that incorporate teachings of the present invention, the operator may elect to remotely adjust the movement imparted. For example, an operator may be able to signal a radio frequency or wireless receiver, like receiver 134, that a change needs to be made to the movement being imparted to the selected line. The operator may also be able to customize and store motion routines on the more feature-focused devices wherein the imparted movement comprises a pulsing tightening and loosening of tension in the selected line.

Method 200 may bounce back and forth between determining step 212 and adjusting step 214 until the operator determines that the imparted movement is sufficient. Preferably, when the movement imparted is sufficient, method 200 may proceed to detecting step 216. At detecting step 216, the operator should be able to reliably identify the selected line form the bundle of lines.

If the operator has a second device, the operator may choose to attach the second device to the now identified selected line and repeat method 200 until the line has been traced. If the operator has only one device, the operator may elect: (1) to tag the now identified selected line; (2) to retrieve the one device; (3) to repeat method 200 at the new location; and (4) to repeat the process until the line has been successfully traced.

Although the present invention has been described in detail, it should be understood that various changes, substitutions and alterations to the devices, methods, and other aspects and techniques of the present invention can be made without departing from the spirit and scope of the invention as defined by the appended claims.

What is claimed is:

1. A device for imparting movement to a selected line, comprising:

a housing having an orifice and at least a first surface comprised of a skid-resistant material;

a strap for fixing the housing in a desired location;

a motion arm coupled to a connection clip, at least a portion of the extending through the motion arm orifice of the housing;

the connection clip operable to be coupled with and to grip the selected line;

a motion generator linked to the motion arm, the motion generator operable to impart movement to the motion arm in at least one direction;

a motion guide positioned such that movement imparted by the motion generator creates movement of the connection clip;

a battery storage location formed as a part of the housing, the battery storage location sized to receive at least one battery;

a power coupling link operable to conducively couple the battery to the motion generator; and a power switch operable to toggle between at least an on and an off position.

2. The device of claim 1, further comprising a power interface conducively coupled to the motion generator, the power interface operable to couple to a power supply cord plugged into a wall outlet.

3. The device of claim 1, further comprising a power indicator formed as a part of the housing, the power indicator operable to provide an indication of remaining power within the battery.

4. The device of claim 1, further comprising a controller communicatively coupled to the motion generator and operable to provide control signals that indicate a desired output of the motion generator.

5. The device of claim 1, wherein the motion generator is further operable to impart movement to the motion arm in at least one additional direction.

6. The device of claim 1, further comprising:

a controller communicatively coupled to the motion generator and operable to provide control signals that indicate a desired output of the motion generator;

a wireless receiver communicatively coupled to the controller.

7. The device of claim 1, wherein the connection clip comprises a block of rubber having a slit in which the selected line may be inserted.

8. The device of claim 1, wherein the selected line comprises a twisted pair of wire.

9. The device of claim 1, further comprising:

a controller communicatively coupled to the motion generator and operable to provide control signals that indicate a desired output of the motion generator; and a first stored motion routine comprising control signals that indicate a first desired output of the motion generator; and a second stored motion routine comprising control signals that indicate a second desired output of the motion generator.

10. A device for moving a selected line, comprising:

a housing with a motion arm opening;

a motion arm extending through the motion arm opening, the motion arm having a connection portion and a link portion;

a connection clip coupled to the motion arm at the connection portion, the connection clip operable to releaseably hold the selected line; and a motion generator linked to the link portion of the motion arm, the motion generator operable to impart movement to the motion arm in at least one direction.

11. The device of claim 10, further comprising:

a driving spring associated with the motion generator, the driving spring operable to provide force to the motion generator; and a key operable to wind the driving spring.

12. The device of claim 10, further comprising a battery conducively coupled to the motion generator.

13. The device of claim 10, further comprising a securing means for fixing the housing in a desired location.

14. The device of claim 10, wherein the motion generator is operable to impart movement in at least one additional direction.

15. The device of claim 10, wherein the imparted movement comprises a pulsing tightening and loosening of tension in the selected line.

* * * * *